United States Patent
Vauchel et al.

(10) Patent No.: US 8,959,768 B2
(45) Date of Patent: Feb. 24, 2015

(54) METHOD FOR MAKING DEICING SYSTEM ON A NACELLE PANEL

(75) Inventors: Guy Bernard Vauchel, Harfleur (FR); Marc Gerome, Le Havre (FR); Laurence Lemains, St Laurent de Brevedent (FR)

(73) Assignee: Aircelle, Gonfreville l'Orcher (FR)

( * ) Notice: Subject to any disclaimer, the term of this patent is extended or adjusted under 35 U.S.C. 154(b) by 447 days.

(21) Appl. No.: 13/057,500

(22) PCT Filed: Jun. 2, 2009

(86) PCT No.: PCT/FR2009/051032
§ 371 (c)(1),
(2), (4) Date: Feb. 4, 2011

(87) PCT Pub. No.: WO2010/015758
PCT Pub. Date: Feb. 11, 2010

(65) Prior Publication Data
US 2011/0133035 A1 Jun. 9, 2011

(30) Foreign Application Priority Data
Aug. 4, 2008 (FR) ................................ 08 04428

(51) Int. Cl.
*B21K 25/00* (2006.01)
*B64D 15/12* (2006.01)
(Continued)

(52) U.S. Cl.
CPC ............... *F02C 7/045* (2013.01); *B64D 29/00* (2013.01); *B64D 33/02* (2013.01); *F02C 7/047* (2013.01);
(Continued)

(58) Field of Classification Search
CPC ............ H05B 2203/017; H05B 2203/034; H05B 3/84; B23P 15/26; B21D 53/92; B64F 5/0054; B64D 15/00; B64D 15/12; B64D 15/14; B64D 2033/0233; B64D 2033/0206; B64D 29/00; F02C 7/047; F02C 7/045; A01B 12/006
USPC .............. 29/611, 890.03, 428, 445, 458, 460, 29/527.2, 889.2, 897.2; 415/119, 175, 415/177, 178; 244/134 D, 134 R, 134 A, 244/134 E; 219/529, 520; 60/39.093
See application file for complete search history.

(56) References Cited

U.S. PATENT DOCUMENTS 5,947,418 A * 9/1999 Bessiere et al. ........... 244/134 D
7,078,658 B2 * 7/2006 Brunner et al. ............... 219/529
(Continued)

FOREIGN PATENT DOCUMENTS

EP 1495963 A2 1/2005
EP 1715159 A1 10/2006
(Continued)

OTHER PUBLICATIONS

International Search Report PCT/FR2009/051032; Dated Jan. 25, 2010.

*Primary Examiner* — Sarang Afzali
(74) *Attorney, Agent, or Firm* — Brinks Gilson & Lione

(57) ABSTRACT

The invention relates to a method for making a deicing system on a panel (22) of a nacelle comprising an outer skin (24) having at least one hole and an inner skin (26), characterized in that it comprises the following steps: A. a grid of resistive elements is positioned on the outer skin (24) with respect to the hole(s) by a positioning means; B. the grid of resistive elements is applied by an application means to the location determined in step A to form the deicing system; C. a surface coating is applied to the resulting deicing system. The present invention also relates to an air inlet lip and to a nacelle comprising a deicing system produced by such method.

11 Claims, 4 Drawing Sheets

(51) Int. Cl.
*F02C 7/045* (2006.01)
*B64D 29/00* (2006.01)
*B64D 33/02* (2006.01)
*F02C 7/047* (2006.01)
*H05B 3/28* (2006.01)

(52) U.S. Cl.
CPC .......... *H05B 3/28* (2013.01); *B64D 2033/0206* (2013.01); *B64D 2033/0233* (2013.01); *B64D 2033/0286* (2013.01); *Y02T 50/67* (2013.01); *Y02T 50/672* (2013.01); *F05D 2250/191* (2013.01); *F05D 2250/283* (2013.01)
USPC ....... 29/889.2; 29/897.2; 29/460; 244/134 D; 244/134 E

(56) References Cited

U.S. PATENT DOCUMENTS

| | | | |
|---|---|---|---|
| 7,588,212 B2* | 9/2009 | Moe et al. | 244/134 D |
| 7,789,620 B2* | 9/2010 | Vontell et al. | 415/178 |
| 7,896,616 B2* | 3/2011 | Livingston et al. | 416/95 |
| 8,240,982 B2* | 8/2012 | Vauchel | 415/119 |
| 2005/0006529 A1* | 1/2005 | Moe et al. | 244/134 D |

FOREIGN PATENT DOCUMENTS

| | | |
|---|---|---|
| EP | 1845018 A2 | 10/2007 |
| EP | 1925551 A1 | 5/2008 |
| FR | 2898868 A1 | 9/2007 |

* cited by examiner

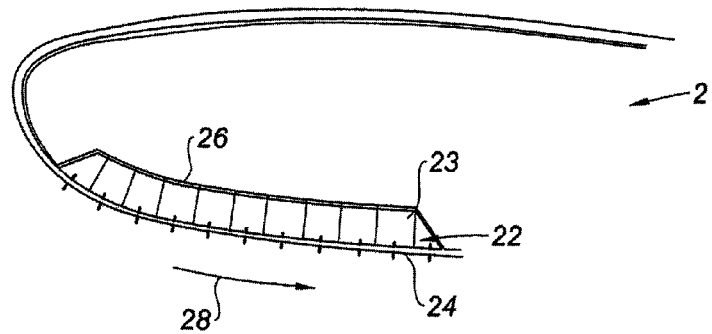
Fig. 2
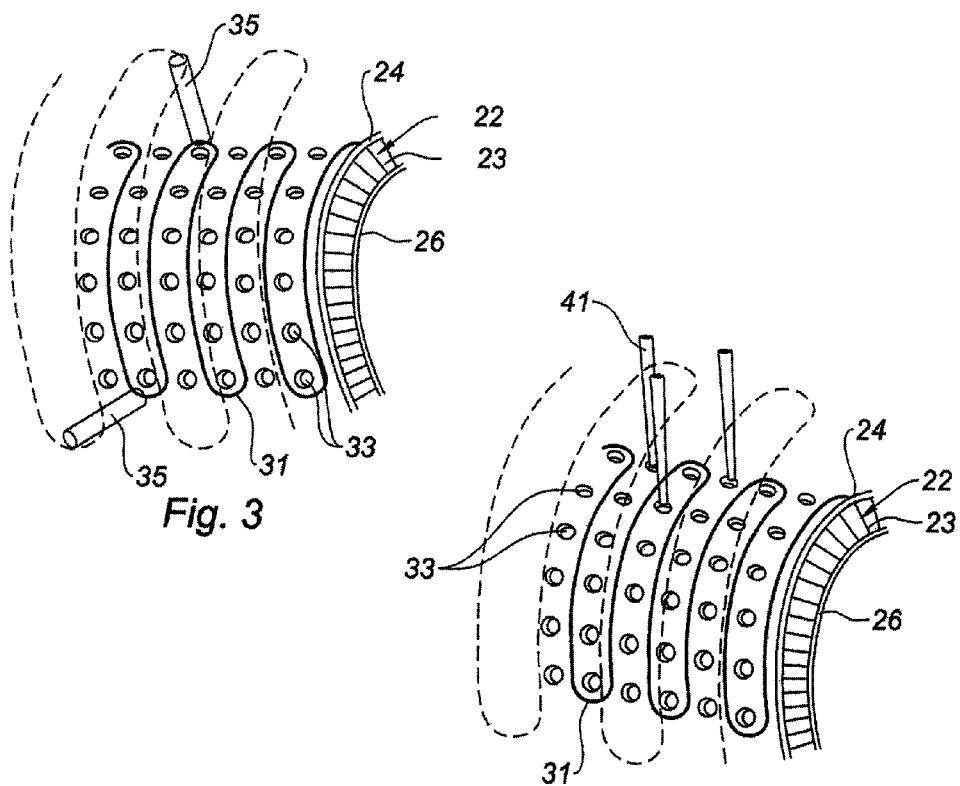
Fig. 3
Fig. 4

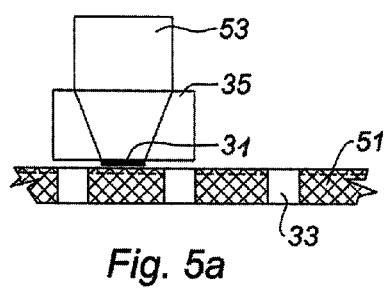
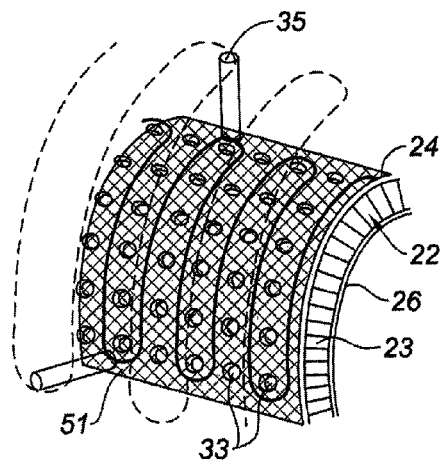
*Fig. 5a*
*Fig. 5b*
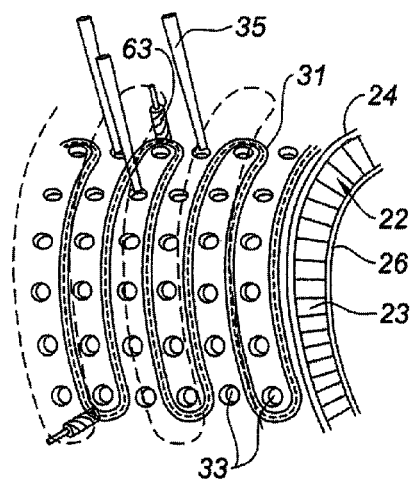
*Fig. 6a*
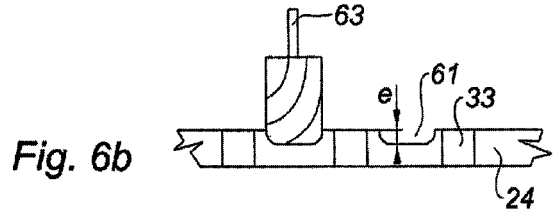
*Fig. 6b*
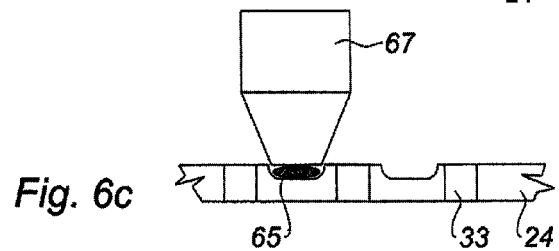
*Fig. 6c*

METHOD FOR MAKING DEICING SYSTEM ON A NACELLE PANEL

TECHNICAL FIELD

The invention relates to a method for making a deicing system on a nacelle panel.

The invention also relates to an air intake lip as well as a nacelle for a turboshaft engine.

BACKGROUND

An airplane is propelled by one or several propulsion assemblies each comprising a turboshaft engine housed in a tubular nacelle. Each propulsion assembly is attached to an aircraft by a mast situated under a wing or at the fuselage.

A nacelle generally has a structure comprising an air intake upstream of the engine and a middle section capable of surrounding a fan of the turboshaft engine, a downstream section housing thrust reverser means and able to surround the combustion chamber of the turboshaft engine. The nacelle ends with a jet nozzle whereof the outlet is situated downstream of the turboshaft engine.

The air intake comprises, on one hand, an air intake lip adapted to allow optimal collection towards the turboshaft engine of the air necessary to supply the fan and internal compressors of the turboshaft engine, and on the other hand, a downstream structure, on which the air intake lip is attached, intended to suitably channel the air towards the blades of the fan. The assembly is attached upstream of the fan case belonging to the upstream section of the nacelle.

In flight, depending on the temperature and moisture conditions, ice can form on the nacelle, in particular at the outer surface of the air intake lip. The presence of ice or frost modifies the aerodynamic properties, which disrupts the conveyance of the air towards the fan.

In order to resolve this problem, it is known to integrate the deicing system in a composite skin that is then perforated in order to obtain at least one fastening hole or a multitude of acoustic holes. The panel perforated with a multitude of acoustic holes forms an acoustic panel able to absorb the noises generated by the operation of the turboshaft engine.

However, the deicing system is generally not visible during the piercing, which causes a significant risk of piercing the resistive elements. Such damage, which is difficult to detect, has the consequence of breaking the continuity of the deicing performance.

BRIEF SUMMARY

One aim of the present invention is to provide a nacelle panel including at least one hole and an efficient deicing system that is easy to implement and ensures ongoing deicing.

To that end, according to a first aspect, the invention relates to a method for making a deicing system on a nacelle panel comprising an outer skin including at least one hole and one inner skin, characterized in that it includes the following steps:

A. a grid of resistive elements is positioned on the outer skin with respect to the hole(s), in particular around the hole(s), by a positioning means, B. the grid of resistive elements is applied by an application means to the location determined in step A to form the deicing system, C. a surface coating is applied to the resulting deicing system.

The method according to the invention prevents the resistive elements from being perforated due to the fact that the grid of resistive elements is mounted around the fastening or acoustic hole(s) of the outer skin formed beforehand. The positioning of the grid is made precisely by good viewing of said holes. Because of this, advantageously, one also avoids blocking the latter parts.

Moreover, the precision of the positioning of the grid makes it possible to consider easier repairs in case of damage to the panel. It is in fact possible to replace the damaged part of the panel and reform the corresponding part of the grid.

The method according to the invention makes it possible to make a grid of resistive elements having a multitude of patterns adapted according to the needs.

According to other features of the invention, the structure according to the invention includes one or several of the following optional features considered alone or according to all possible combinations:

- the panel also includes a honeycomb structure that makes it possible to obtain a structuring panel more resistant to mechanical stresses;
- the outer skin includes acoustic holes, the method according to the invention making it possible not to limit the acoustic performance of the panel by blocking the acoustic holes;
- between step A and step B, a groove is formed on the outer skin using a grooving means to receive the resistive elements, which makes it possible to integrate resistive elements that have a thickness interfering with the aeronautic performance of the panel according to the invention;
- the thickness of the groove is greater than or equal to the thickness of the resistive elements, which makes it possible to prevent the resistive elements from going beyond the groove;
- the grooving is made by removing material, which makes it possible to ensure good grooving;
- the outer skin includes, in its thickness, a metal mesh that makes it possible to ensure an effective aerodynamic surface;
- in step C, a perforated or woven surface coating is used, which makes it possible not to interfere with the acoustic performance of the acoustic panel;
- in step C, a metal mesh is used as surface coating, which makes it possible to obtain good resistance to erosion;
- steps A and B are done simultaneously.

According to another aspect, the invention relates to an air intake lip, characterized in that it includes at least one panel comprising a deicing system obtained using the method according to the invention. The method according to the invention provides a panel that is particularly adapted to allow deicing of that part of the nacelle. Indeed, in that part, the presence of ice or frost disrupts the conveyance of the air towards the fan.

According to still another aspect, the invention relates to an aircraft including a panel obtained according to the method of the invention.

BRIEF DESCRIPTION OF THE FIGURES

The invention will be better understood upon reading the following non-limiting description, done in reference to the appended figures.

FIG. 2 is a diagrammatic transverse cross-section of an air intake lip according to the invention;

FIGS. 3 and 4 are partial perspective views of a deicing system at the end of step A of the method according to the invention;

FIGS. 5a and 5b are partial perspective views of a deicing system at the end of alternatives of step A of the method according to the invention of FIG. 4;

FIGS. 6a to 6c are partial perspective views of the deicing system at the end of a step between step A and step B of the method according to the invention;

DETAILED DESCRIPTION

Figure 1:
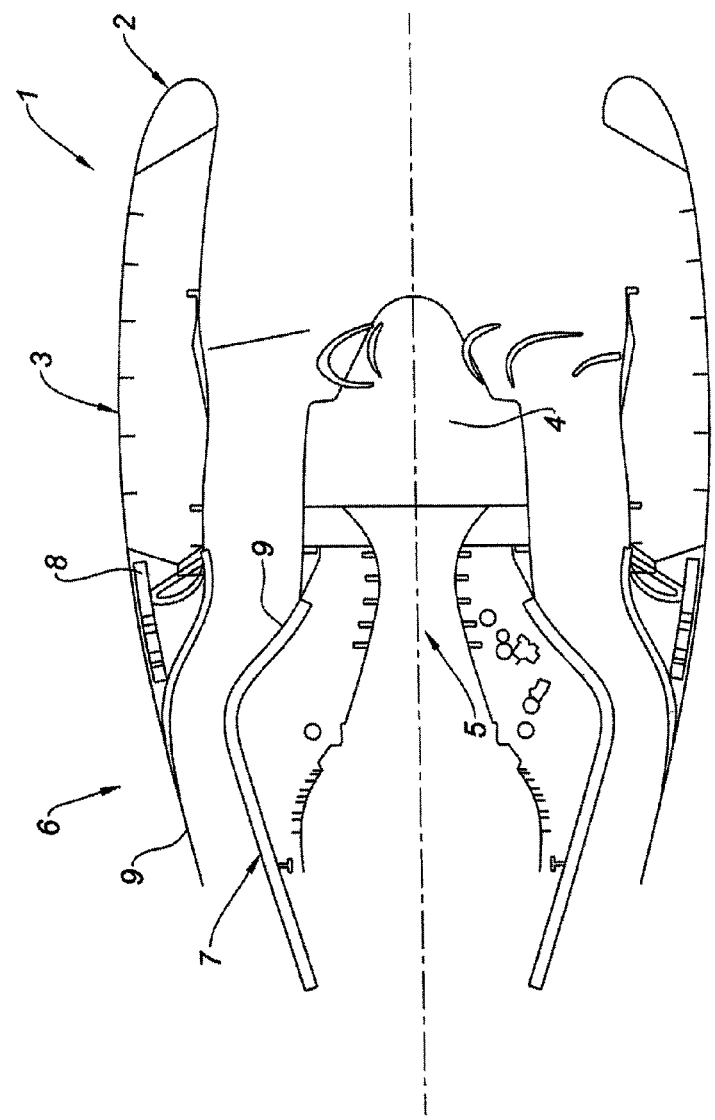
FIG. 1 is a transverse diagrammatic cross-section of a nacelle according to the invention surrounding a turboshaft engine.

As shown in FIG. 1, a nacelle 1 according to the invention comprises an air intake lip 2, a middle structure 3 surrounding a fan 4 of a turboshaft engine 5 and a downstream assembly 6. The downstream assembly 6 is made up of an inner fixed structure 7 (IFS) surrounding the upstream portion of the turboshaft engine 5, an outer fixed structure 8 (OFS) and a mobile cowl 9 including thrust reverser means.

The nacelle 1 according to the invention has elements, including the air intake lip 2, capable of being covered with frost or ice, which is damaging to the performance of the aircraft. The deicing system of the present invention makes it possible to eliminate frost or said ice on these elements and in particular on the air intake lip 2. Said elements can have surfaces of all shapes. Examples include the presence of deicing around the access panel fastenings or the presence of deicing around the drain hole of elements of the nacelle 1.

According to the embodiment illustrated in FIG. 2, the air intake lip 2 has a panel comprising a deicing system obtained using the method according to the invention. In that case, the panel is an acoustic panel 22 including an acoustic absorption structure 23, in particular a honeycomb structure, on which a solid inner skin 26 and an outer skin 24 perforated with acoustic holes are fastened. The outer skin 24 is intended to be in contact with the cold air flow 28.

The panel used in the method of the invention is not limited to an acoustic panel and can also be a non-acoustic panel including fastening holes intended to allow said panel to be fastened on an element of the nacelle, in particular air intake lip 2. The panel can include, in addition to an outer skin and an inner skin, a honeycomb structure making it possible to obtain a structural panel able to better withstand mechanical stresses. The panel can also not include such honeycomb structures and only an outer and inner skin that can be in the form of a single layer.

Examples of such panels include aerodynamic lower panels including at least one active drainage hole in all of the flight phases of the aircraft.

The deicing system is obtained using the method according to the invention comprising the following steps:

A. a grid of resistive elements is positioned on the outer skin with respect to the hole(s), or around the hole(s), in particular fastening or acoustic holes, by a positioning means, B. the grid of resistive elements is applied by an application means to the location determined in step A to form the deicing system, C. a surface coating is applied to the resulting deicing system.

The method according to the invention allows better positioning and better viewing of the grid around said holes of the outer skin 24. Piercing said resistive elements and continuity breaks in the deicing performance are thus avoided.

Moreover, the method according to the invention advantageously avoids obstruction of the holes. In the case of an acoustic panel, this results in better efficiency of the acoustic performance.

The method according to the invention advantageously allows easier repairs in case of damage. Indeed, the damaged part of the grid of resistive elements is replaced simply by the naked eye with a non-damaged part. The damaged part of the grid can then be repositioned and replaced.

In the case of an acoustic panel, the method according to the invention advantageously makes it possible to obtain a suitable distribution of the acoustic holes on the acoustic panel to provide the desired acoustic absorption. It is then possible to optimize the acoustic absorption and the structural resistance of the acoustic panel 22.

As shown in FIG. 3, in step A of the method according to the invention, a grid 31 of resistive elements is positioned on the outer skin 24 relative to the hole(s) 33 using a positioning means 35.

According to one embodiment, before step A, it is possible, using a computer or any other means known by those skilled in the art, to program the pattern of the grid 31 as a function of the desired final distribution of the holes 33.

In the case where the panel 22 has a multitude of holes 33, the positioning comprises a step for detecting neighboring holes that, due to the manufacturing tolerance of the outer skin 24, are offset relative to their theoretical position typically determined by computer. Indeed, holes 33 are perforated in the outer skin 24 using piercing tools. The piercing tools have an inherent positioning error, which leads to an offset in the positioning of those holes 33 relative to the theoretical positioning. Moreover, the geometry of the panel 22 can accentuate the error in the positioning of said holes 33.

The positioning means 35 used in step A can, for example, be a laser 41 (see FIG. 4). The laser 41 makes it possible to ensure precise positioning of the holes 33. It is also possible to combine the laser 41 with other types of positioning means 35.

According to one preferred embodiment illustrated in 5a and 5b, the outer skin 24 includes a wire mesh 51 in its thickness. The positioning is then ensured, for example, by X rays or any other suitable device known by those skilled in the art.

In step B of the method according to the invention, the grid of resistive elements 31 is applied on the location determined in step A to form the deicing system.

The application of the grid 31 of resistive elements can be done using any application means known and adapted by one skilled in the art. Examples include application by substrate bus or filamentary resistive elements. It is possible for the deposition of the resistive elements to be done by serigraphy.

According to one alternative, the positioning means 35 used in step A includes an application means 53, as shown in FIG. 5a. Such a configuration makes it possible to limit the bulk during application of the grid 31.

Step A and step B can be successive or simultaneous. Simultaneous steps A and B advantageously make it possible to save time during production of the deicing system.

For example, the resistive elements are in the form of a substrate charged with thermal elements such as paints, adhesive resistive elements, resistive elements melted on the outer skin 24 during application, and/or resistive elements coated with an electrically capable electro-insulating sheath on a face to be adhered on the outer skin 24 by adhesion or electrostatics until installation of the surface coating in an adhesive material.

"Adhesive" means here that the material is capable of durably adhering on a surface by contact without adding outside elements.

"Melted resistive elements" means here that the consistency of such resistive elements is intermediate between a solid and a liquid during passage in a bus by heating and adhere on the outer skin upon cooling.

In the embodiment where the resistive elements are coated in an adhesive material, the resistive elements are electrically, but not thermally insulated so as to be able to proceed with the deicing of the element of the nacelle to be deiced, in particular the air intake lip 2.

According to an embodiment shown in FIGS. 6a to 6c, between step A and step B, a groove 61 is formed on the outer skin 24 using a grooving means 63 to receive the resistive elements 65.

Such a grooving makes it possible to integrate the resistive elements 65 without preventing the application of the surface coating in the case where the resistive elements 65 have a thickness sufficient to interfere with the aeronautic performance of the acoustic panel 22. This configuration makes it possible to keep the same integrity and the same structural strength of said panel 22.

Typically, the thickness of the groove e is greater than or equal to the thickness of the resistive elements 65. Because of this, advantageously, it is possible to avoid part of the resistive elements 65 protruding past the surface of the outer skin 24, and thus compromising the application of the surface coating.

Preferably, the grooving is done by removing material, which makes it possible to ensure good grooving. To that end, it is possible to perform this removal mechanically, in particular by milling or grinding. It is also possible to use a chemical means to remove material and form grooves.

When the groove 61 is formed on the outer skin 24, the resistive elements are applied using an application means 67 so as to form the grid 31 of resistive elements (see FIG. 6b).

In the case where the resistive elements 65 are not insulated, the thickness e of the groove is greater than the thickness of the deposition of the resistive elements 65. Such a thickness makes it possible to apply an insulator in the resistive elements 65. The insulator is typically deposited in the liquid state in the groove 61 and on the resistive elements 65 while having an excess thickness relative to the surface of the outer skin 24, which is then eliminated using any means known by those skilled in the art.

As shown in FIGS. 7a to 7d, in the case of an acoustic panel or a panel comprising a multitude of holes, it is possible to apply the grid 31 of resistive elements using quite varied patterns.

Figure 7A:
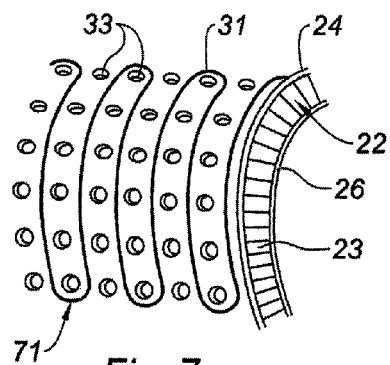
FIGS. 7a to 7d are partial perspective views of the deicing system at the end of step B.

According to a first embodiment shown in FIG. 7a, the grid 31 is applied on the outer skin 24 using a simple pattern 71 containing only one row of holes 33.

Figure 7B:
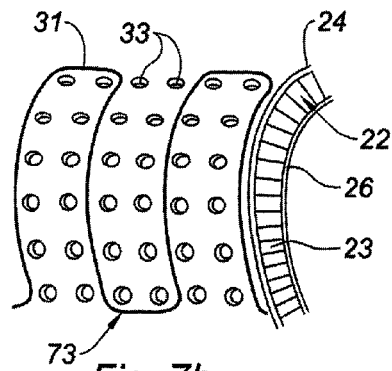

According to another embodiment shown in FIG. 7b, the grid 31 follows a pattern 73 containing several rows of holes 33, for example two or three rows.

Figure 7C:
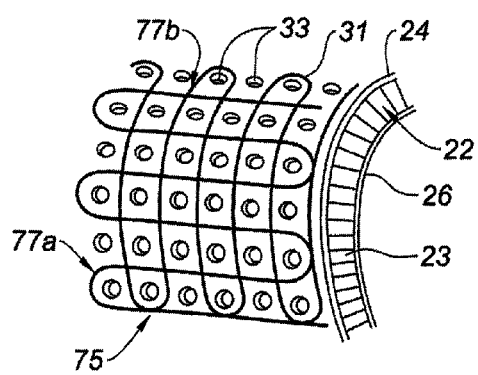
Figure 7D:
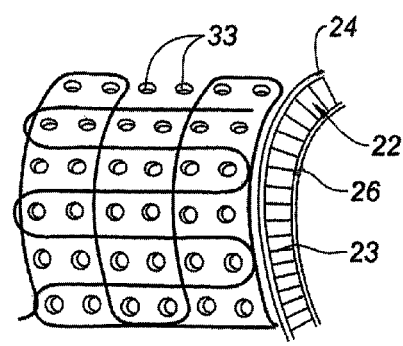

According to an embodiment shown in FIGS. 7c and 7d, the grid 31 follows a so-called "cross" pattern 75, called "cross" because it is made up of a first pattern 77a containing one or several rows and a second pattern 77b containing one or several rows positioned substantially perpendicular to the first pattern 77a. This embodiment is not limited to two patterns 77a and 77b, but can instead have more than three patterns.

The patterns 77a and 77b can also be deposited on one or several levels of resistive elements 65, for example in a stack by joining an intermediate insulation thereto or crossed on a single level of resistive elements 65.

Moreover, it is possible for the patterns 77a and 77b not to have the same number of rows.

When the grid 31 of resistive elements is applied on the outer skin 24, it is advantageously possible to visually check the application. If necessary, it is possible to modify the path of the grid 31.

Figure 8:
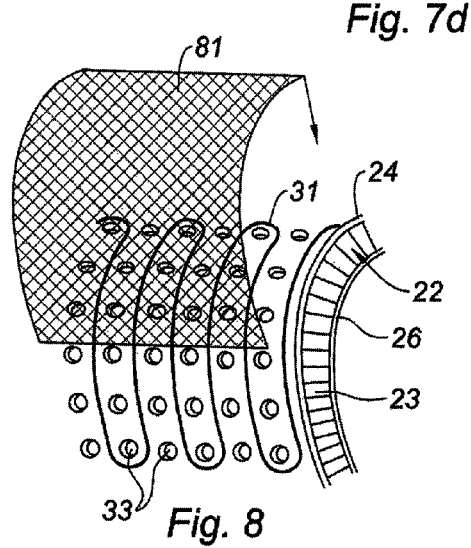
FIG. 8 is a partial perspective view of the deicing system at the end of step C.

According to the embodiment shown in FIG. 8, a surface coating 81 is applied on the deicing system thus obtained. The coating 81 makes it possible to ensure an efficient aerodynamic surface by smoothing out any flaws in the outer skin 24. The surface coating 81 is preferably perforated or woven, which makes it possible not to interfere with the acoustic performance of an acoustic panel. The surface coating 81 is in particular of the metal mesh type, which makes it possible to obtain good resistance to erosion and lightning. According to certain applications, it is also possible for the mesh not to be metal, but for instance fluorinated resin.

The surface coating 81 can be more or less opaque so as to make the resistive elements 65 more or less visible to the naked eye.

The resistive elements 65 being positioned on the outer skin 24, it is thus possible to simply repair the panel 22 if it is damaged. Indeed, it is very easy to replace the damaged part of the panel 22 including the hole(s), then to again apply the missing part of the pattern of the grid 31 on the damaged parts of the outer skin 24. Above the newly replaced pattern of the grid, a patch of the surface coating 81 is applied to reform the aerodynamic line of the panel 23.

The invention claimed is:

1. A method for making a deicing system on a nacelle panel comprising an outer skin including a plurality of holes and one inner skin, the method comprising:
   A. detecting positions of the plurality of holes that are offset relative to their theoretical position due to manufacturing tolerances; and
   B. applying resistive elements by an application means to a location based on the detected positions of the plurality of holes that are offset from their theoretical position determined in step A to form the deicing system, the application means comprising depositing the resistive elements in a pattern, and modifying the path of the pattern, based on the detected positions of the plurality of holes to avoid obstruction of the plurality of holes.

2. The method according to claim 1, wherein between step A and step B, a groove is formed on the outer skin using a grooving means to receive the grid of resistive elements.

3. The method according to claim 2, wherein a depth of the groove is greater than or equal to a thickness of the resistive elements.

4. The method according to claim 2, wherein the groove is made by removing material.

5. The method according to claim 1, wherein, in step C, a perforated or woven surface coating is used.

6. The method according to claim 5, wherein, in step C, a metal mesh is used as surface coating.

7. The method according to claim 1, wherein the panel also includes a honeycomb structure.

8. The method according to claim 1, wherein the outer skin includes acoustic holes.

9. The method according to claim 1, wherein the outer skin includes, in a thickness thereof, a metal mesh.

10. The method according to claim 1, wherein said positioning the grid of resistive elements on the outer skin in step A and said applying the grid of resistive elements by the application means of step B are done simultaneously.

11. The method according to claim 1 further comprising the step of applying a surface coating to the resulting deicing system.

\* \* \* \* \*